(12) United States Patent
Good

(10) Patent No.: US 6,820,943 B2
(45) Date of Patent: Nov. 23, 2004

(54) ONE WAY FREE SPINNING HUBCAP

(76) Inventor: Lawrence D. Good, 1012 W. Vine St., Champaign, IL (US) 61821

( * ) Notice: Subject to any disclaimer, the term of this patent is extended or adjusted under 35 U.S.C. 154(b) by 0 days.

(21) Appl. No.: 10/683,296

(22) Filed: Oct. 14, 2003

(65) Prior Publication Data
US 2004/0075332 A1 Apr. 22, 2004

Related U.S. Application Data

(63) Continuation-in-part of application No. 10/201,295, filed on Jul. 24, 2002, now Pat. No. 6,655,061.

(51) Int. Cl.$^7$ ................................................ B60B 7/00
(52) U.S. Cl. ............................. 301/37.101; 301/37.25; 40/587
(58) Field of Search .......................... 301/37.25, 37.105, 301/37.101, 37.108, 37.23, 111.03, 108.1; 40/587, 591

(56) References Cited

U.S. PATENT DOCUMENTS

| 3,158,946 | A | | 12/1964 | Upchurch |
| 4,929,030 | A | * | 5/1990 | Park .......................... 301/37.25 |
| 5,490,342 | A | * | 2/1996 | Rutterman et al. ........... 40/587 |
| 5,588,715 | A | | 12/1996 | Harlen |
| 5,659,989 | A | | 8/1997 | Hsiao et al. |
| 6,554,370 | B2 | * | 4/2003 | Fowlkes .................. 301/37.25 |
| 6,637,830 | B1 | * | 10/2003 | Burgess .................... 301/37.25 |

* cited by examiner

Primary Examiner—Frantz F. Jules
(74) Attorney, Agent, or Firm—Richard C. Litman

(57) ABSTRACT

A one way free spinning hubcap assembly that allows hubcaps of a vehicle to freely spin in one direction independent of the rotation of the associated wheel. For example, when a vehicle using the invention accelerates or maintains its forward velocity the hubcaps of a vehicle are forced to spin at the same rate as the wheels. However, when the vehicle then slows or stops the hubcaps are free to continue spinning independently of the motion of the wheels.

11 Claims, 3 Drawing Sheets

ONE WAY FREE SPINNING HUBCAP

CROSS-REFERENCE TO RELATED APPLICATION

This application is a continuation-in-part of application Ser. No. 10/201,295 filed Jul. 24, 2002 now U.S. Pat. No. 6,655,061.

BACKGROUND OF THE INVENTION

1. Field of the Invention

The present invention relates to hubcaps, in particular to a hubcap assembly that permits a hubcap to spin independently from an associated vehicular wheel in only one direction of rotation.

2. Description of Related Art

There have been a plethora of inventions relating to rotating hubcaps and wheel covers. For example, U.S. Pat. No. 5,490,342 to Rutterman et al., U.S. Pat. No. 5,588,715 to Harlen, and U.S. Pat. No. 5,659,989 to Hsiao et al., disclose different mechanisms which allow a hubcap to maintain its rotational orientation independent of the rotation of the associated wheel. Each of these inventions employs some type of weighting mechanism to maintain the hubcap's orientation regardless of the reverse or forward rotation of the associated wheel. These inventions differ from the present invention in that the present invention employs no weighting mechanism, and permits the hubcap to rotate independently from its associated wheel in only one direction of rotation.

U.S. Pat. No. 3,158,946 discloses a spinning hubcap designed to be spun relative to the vehicle wheel on which it is mounted, as the vehicle wheel rolls forward, and to continue to spin after the vehicle wheel has been brought to a stop. The '946 invention differs from the present invention in that the present invention uses a bearing clutch rather than a ratchet type mechanism to control hubcap rotation.

None of the above inventions and patents, taken either singly or in combination, is seen to disclose a one-way spinning hubcap as will subsequently be described and claimed in the instant invention.

SUMMARY OF THE INVENTION

The one way free spinning hubcap assembly is a novelty device that allows a vehicle's hubcaps to freely spin in one direction independent of the rotation of the associated wheel. For example, when a vehicle using the invention accelerates or maintains its forward velocity the vehicles hubcaps are forced to spin at the same rate as the wheels. However, when the vehicle then slows or stops the hubcaps are free to continue spinning independently of the motion of the wheels.

The present assembly incorporates only six parts, which include a base plate, a spacer nut, a nut, a clutch bearing, a bolt and a spinner hubcap.

Accordingly, it is a principal object of the invention to provide a spinner hubcap assembly that is free to rotate, in one direction only, independently of the associated wheel.

It is another object of the invention to provide a spinner hubcap assembly that projects the illusion of forward motion in a stopped vehicle.

It is a further object of the invention to provide a spinner hubcap assembly that requires a minimum number of parts and is easy to mount.

It is an object of the invention to provide improved elements and arrangements thereof in an apparatus for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
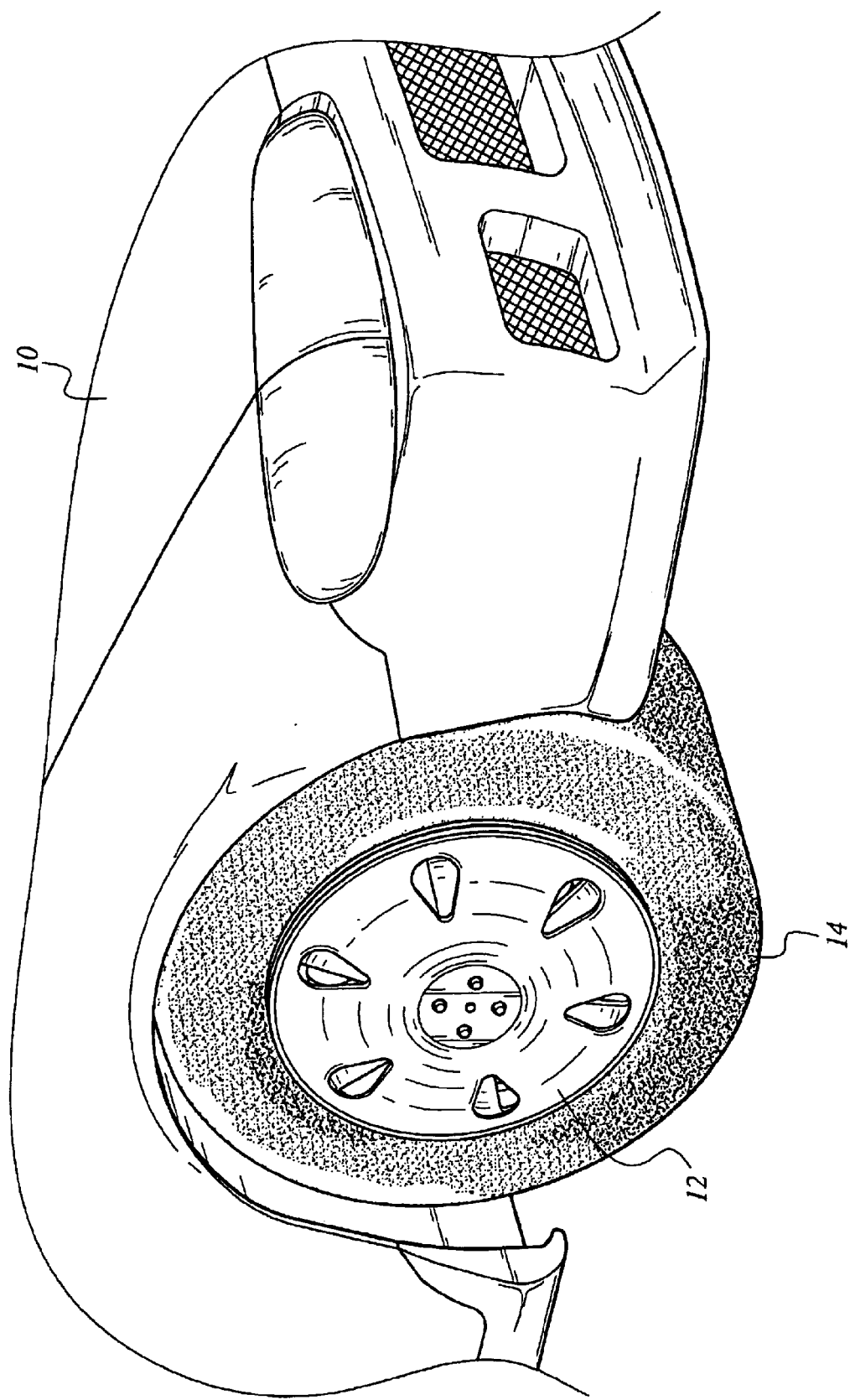
FIG. 1 is an environmental, perspective view of a wheel having a one-way free-spinning hubcap according to the present invention.
Figure 2:
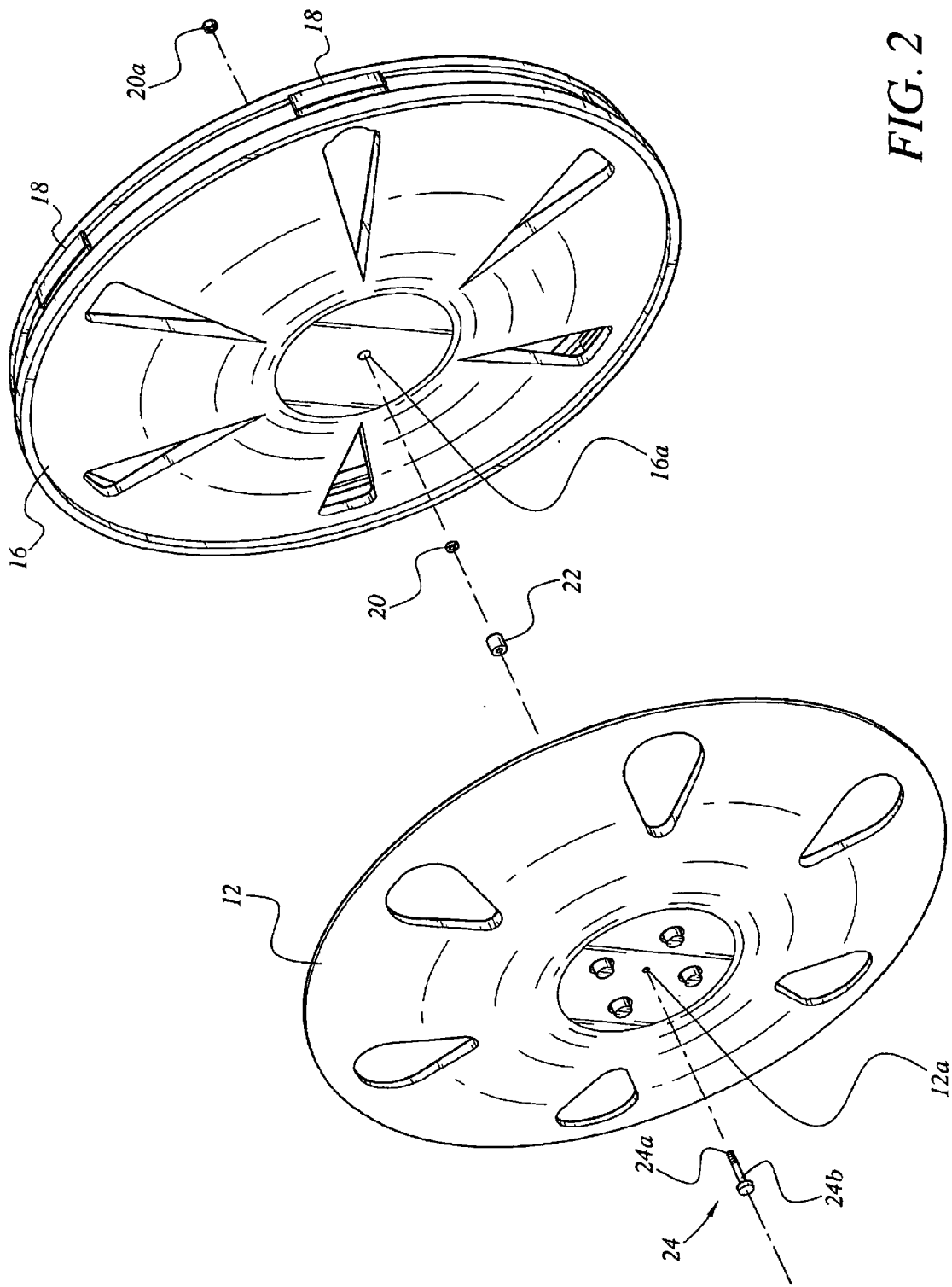
FIG. 2 is an exploded, perspective view of a one-way, free-spinning hubcap assembly according to the present invention.
Figure 3:
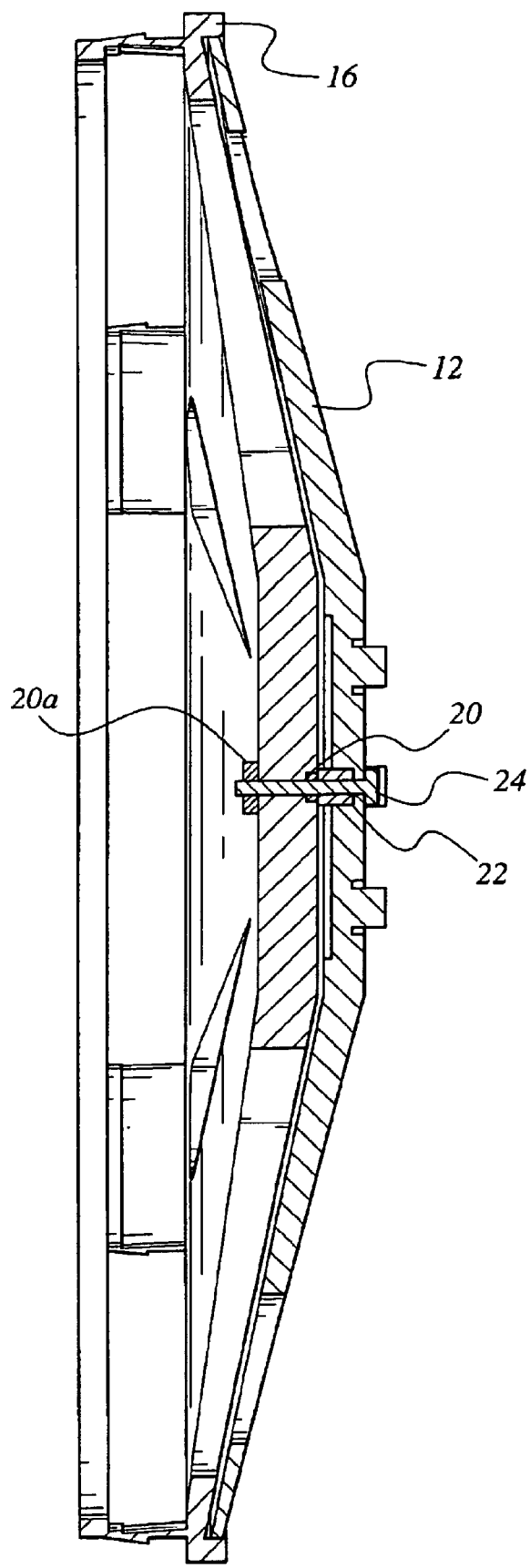
FIG. 3 is a side sectional view of a one-way, free-spinning hubcap assembly according to the present invention.

Attention is first directed to FIG. 1 wherein the spinner hubcap 12 is mounted on the wheel 14 of vehicle 10. As best illustrated in FIGS. 2 and 3, there are only six parts required to mount hubcap 12 on the wheel 14. The six parts include a disc-shaped base plate 16 having expansion tabs 18 spaced evenly there around for securing the base plate to the wheel of the vehicle. Base plate 16 has a central cavity 16a to receive a spacer nut 20 therein and a periphery fabricated from expansion wire. Spinner hubcap 12 is provided with a central bore 12a for receiving a clutch bearing 22. A bolt 24 has threads 24a disposed on its distal end for engaging the threads in the nut 20a. The proximate end of bolt 24 terminates in a bolt head. A smooth area 24b is disposed adjacent the bolt head whereon clutch bearing can ride. When assembled (FIG. 3), a slight gap exists between base plate 16 and spinner hubcap 12 so that the hubcap can spin freely.

It is to be understood that the present invention is not limited to the embodiment described above, but encompasses any and all embodiments within the scope of the following claims.

What is claimed is:

1. A one-way, free-spinning hubcap assembly, comprising:
    a disc-shaped base plate, said base plate having a front face, a center area, a recess disposed in the front face of said base plate at said center area, and a periphery;
    a free-spinning disc-shaped hubcap, said hubcap having a bore disposed in a center area thereof;
    a clutch bearing member, said clutch bearing member positioned in said bore; and
    a mounting assembly for mounting said hubcap to said base plate, wherein said mounting assembly includes a spacer nut positioned in said recess.

2. A hubcap assembly according to claim 1, including a series of expansion tabs evenly spaced around the periphery of said base plate.

3. A hubcap assembly as recited in claim 1, wherein said periphery of said base plate is fabricated from expansion wire.

4. A one-way, free-spinning hubcap assembly, comprising:
    a disc-shaped base plate, said base plate having a front face, a center area and a periphery;

a free-spinning disc-shaped hubcap, said hubcap having a bore disposed in a center area thereof;

a clutch bearing member, said clutch bearing member positioned in said bore; and a mounting assembly for mounting said hubcap to said base plate, wherein said mounting assembly includes a bolt disposed through said clutch bearing member.

5. A hubcap assembly according to claim 4, wherein said bolt has a proximate end and a distal end and wherein screw threads are defined on said distal end and wherein said proximate end terminates in a bolt head and including a nut for engaging said screw threads.

6. A hubcap assembly according to claim 4, wherein said bolt includes a smooth area adjacent said bolt head for engagement with said clutch bearing member.

7. A one-way, free-spinning hubcap assembly, comprising:

a disc-shaped base plate, said base plate having a front face, a center area and a periphery;

a series of expansion tabs evenly spaced around the periphery of said base plate;

a free-spinning disc-shaped hubcap, said hubcap having a bore disposed in a center area thereof;

a clutch bearing member, said clutch bearing member positioned in said bore;

a mounting assembly for mounting said hubcap to said base plate, wherein said mounting assembly includes a recess disposed in the front face of said base plate at said center area and a spacer nut positioned in said recess.

8. A hubcap assembly according to claim 7, wherein said mounting assembly includes a bolt disposed through said clutch bearing member.

9. A hubcap assembly according to claim 8, wherein said bolt has a proximate end and a distal end and wherein screw threads are defined on said distal end for engagement with said nut and wherein said proximate end terminates in a bolt head and including a nut for engaging said screw threads.

10. A hubcap assembly according to claim 9, wherein said bolt includes a smooth area adjacent said bolt head for engagement with said clutch bearing member.

11. A hubcap assembly as recited in claim 10, wherein said periphery of said base plate is fabricated from expansion wire.

\* \* \* \* \*